United States Patent
Ploog et al.

(10) Patent No.: US 12,497,078 B2
(45) Date of Patent: Dec. 16, 2025

(54) METHOD FOR CONTROLLING A DRIVING BEHAVIOR OF AN AUTONOMOUSLY DRIVING VEHICLE, PROCESSING DEVICE FOR PERFORMING THE METHOD, DATA STORAGE MEDIUM AND VEHICLE

(71) Applicant: ARGO AI GMBH, Munich (DE)

(72) Inventors: Mareike Ploog, Munich (DE); Miria Von Rotberg, Munich (DE)

(73) Assignee: Volkswagen Group of America Investments, LLC, Reston, VA (US)

( * ) Notice: Subject to any disclaimer, the term of this patent is extended or adjusted under 35 U.S.C. 154(b) by 268 days.

(21) Appl. No.: 18/259,663

(22) PCT Filed: Dec. 30, 2021

(86) PCT No.: PCT/EP2021/087849
§ 371 (c)(1),
(2) Date: Jun. 28, 2023

(87) PCT Pub. No.: WO2022/144418
PCT Pub. Date: Jul. 7, 2022

(65) Prior Publication Data
US 2024/0217556 A1     Jul. 4, 2024

(30) Foreign Application Priority Data
Dec. 30, 2020   (EP) .................................... 20217921

(51) Int. Cl.
*B60W 60/00*       (2020.01)
(52) U.S. Cl.
CPC ... *B60W 60/0027* (2020.02); *B60W 2420/403* (2013.01); *B60W 2552/00* (2020.02);
(Continued)

(58) Field of Classification Search
CPC .... B60W 30/08; B60W 30/09; B60W 30/095; B60W 30/0956; B60W 40/06;
(Continued)

(56) References Cited

U.S. PATENT DOCUMENTS

| | | |
|---|---|---|
| 9,483,948 B1 | 11/2016 | Gordon et al. |
| 11,753,041 B2 * | 9/2023 | Refaat ..................... G01S 17/58 701/23 |

(Continued)

FOREIGN PATENT DOCUMENTS

WO     2020062032 A1     4/2020

OTHER PUBLICATIONS

International Search Report and Written Opinion for PCT/EP/2021/087849 dated Apr. 25, 2022, 13 pages.

*Primary Examiner* — Brandon Z Willis
(74) *Attorney, Agent, or Firm* — Fox Rothschild LLP

(57) ABSTRACT

A method for controlling a driving behavior of an autonomously driving vehicle, wherein a processing device performs the following steps for at least one region of a road network: receiving trace data of the region, wherein the trace data describe at least one trace of historic movements and/or behaviors of past traffic participants in the region, wherein the movements and/or behaviors are incompatible with and/or not anticipated by traffic regulations currently valid in the region; deriving rule data describing regular movements and/or behaviors of the past traffic participants described by the trace data; and providing the rule data to a motion model of the vehicle, wherein the vehicle comprises a driving control system (DCS) that plans and/or adapts a driving trajectory by detecting a traffic participant in the region and predicting a future behavior of the participant using the motion model.

14 Claims, 1 Drawing Sheet

(52) U.S. Cl.
CPC . *B60W 2554/20* (2020.02); *B60W 2554/4046* (2020.02); *B60W 2555/60* (2020.02); *B60W 2556/10* (2020.02); *B60W 2556/40* (2020.02)

(58) Field of Classification Search
CPC ......... B60W 50/0097; B60W 50/0098; B60W 60/0011; B60W 60/0015; B60W 60/0017; B60W 60/0027; B60W 60/00274; B60W 2420/403; B60W 2552/00; B60W 2552/35; B60W 2552/45; B60W 2552/05; B60W 2552/50; B60W 2554/40; B60W 2554/20; B60W 2554/4026; B60W 2554/4029; B60W 2554/4046; B60W 2554/4045; B60W 2554/4041; B60W 2555/60; B60W 2556/10; B60W 2556/40; B60W 2720/10; B60W 2720/24; G08G 1/005; G08G 1/165; G08G 1/166; G06V 20/182; G06V 20/188; G06V 40/00; G06V 40/20; G05D 1/0212; G05D 1/0214; G05D 1/617; G06T 2207/30236; G06T 2207/30252; G06T 2207/30261; G06T 2207/30256

See application file for complete search history.

(56) References Cited

U.S. PATENT DOCUMENTS

| | | | |
|---|---|---|---|
| 2012/0095682 A1* | 4/2012 | Wilson | G01C 21/3841 |
| | | | 701/532 |
| 2019/0152490 A1 | 5/2019 | Lan et al. | |
| 2021/0139026 A1* | 5/2021 | Phan | B60W 60/00274 |
| 2023/0324187 A1* | 10/2023 | Wang | G06Q 10/047 |
| | | | 701/410 |
| 2024/0428682 A1* | 12/2024 | Ramamoorthy | B60W 60/0015 |

* cited by examiner

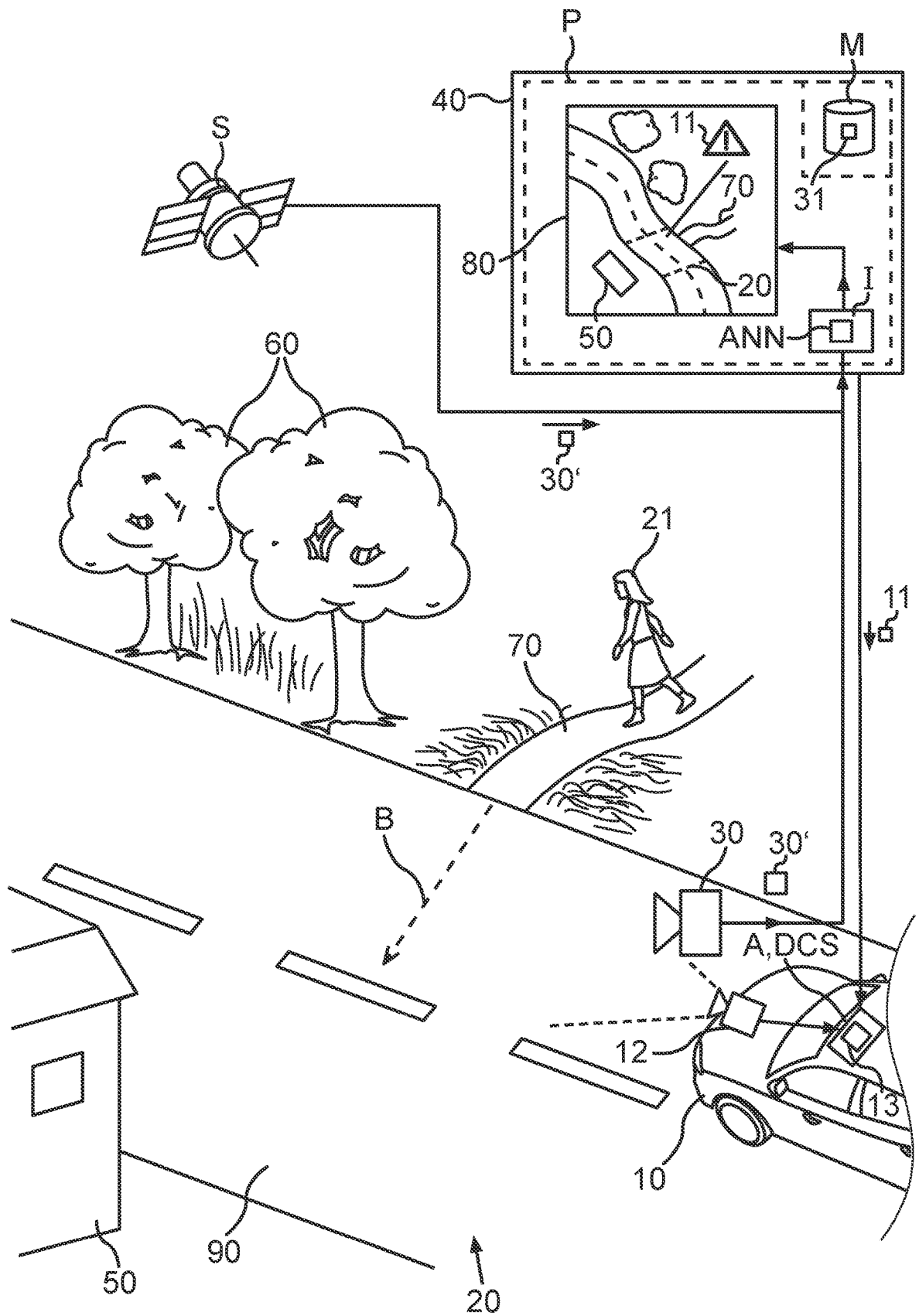

METHOD FOR CONTROLLING A DRIVING BEHAVIOR OF AN AUTONOMOUSLY DRIVING VEHICLE, PROCESSING DEVICE FOR PERFORMING THE METHOD, DATA STORAGE MEDIUM AND VEHICLE

CROSS-REFERENCE TO RELATED APPLICATIONS

This application is a U.S. National Stage entry under 35 U.S.C. § 371 based on and claiming priority to International Application No. PCT/EP2021/087849, filed on Dec. 30, 2021, which was published under International Publication NO. WO 2022/144418, and which in turn claims priority to European Patent Application No. 20217921.4, filed Dec. 30, 2021. The disclosures of the priority applications are incorporated into this document by reference.

BACKGROUND

In general, the behavior of traffic participants may not only be determined by the traffic rules that are currently valid in a specific point or in a specific region of a road network. Instead, outdated traffic regulations as well as habits may also result in an unexpected, but still rule-based behavior. Such a behavior could be taken into account by an ADV, if these ghost rules or in-official rules where known and available to the ADV.

For example, along a road, there can be places where people have developed the habit of regularly crossing the road although there is no officially marked crossing area for doing that. For example, when there is an office/university building on one side of the road and a fast food restaurant or a cafeteria on the other side, people leaving the office/university building tend to directly cross the road in a straight line leading from the office/university building to the restaurant/cafeteria. If this happens regularly, trodden paths can be seen, e.g., in the green grass stripe on the roadside to the left and right of the road (there is a brown muddy path in the green grass).

A similar problem may arise when traffic rules change in a specific spot, for example at a crossroads. Some traffic participants who pass by this spot regularly may still act according to the former, now invalid rules, as they might not have realized the change in the traffic rules or as they might be un-concentrated.

However, non-official, habitual crossing areas are not known to an ADV. Likewise, old traffic regulations are not part of an updated database. Instead, an ADV will only consider the current, updated traffic regulations. Therefore, an ADV passing by a habitual crossing area or a crossroads where the rules have changed recently will not adapt its driving strategy accordingly. The ADV will not take into account the possibility that a pedestrian might follow an in-official rule that might come from the habit of directly crossing the road or from an outdated traffic regulation.

In the prior art, there is a solution in connection with known hot spots or areas with a high rate of accidents. Such a hot spot is observed with a camera for a long time (several days) and by counting where pedestrians have crossed the road, and finally a statistical description of the pedestrians' behavior is obtained. This solution is time consuming and is not applicable for a large road network, only for certain, already known hot spots.

Document WO 2020/062032 A1 discloses a system that receives a captured image perceiving an environment of a vehicle from an image capturing device of the vehicle and the system identifies an obstacle in motion near the vehicle based on the captured image and the system predicts a location for the moving obstacle at each of a number of time points.

Document U.S. Pat. No. 9,483,948 B1 discloses using a recognition signal from a pedestrian signal transceiver worn by a pedestrian for detecting the pedestrian.

Document US 2019/152490 A1 discloses operations that include determining an interaction between a first object and one or more second objects. The operations include determining one or more predicted trajectories of the first object within the surrounding environment based at least in part on the interaction between the first object and the one or more second objects.

SUMMARY

The problem underlying the invention is to consider a possible habitual behavior of traffic participants (pedestrians/cyclists/vehicles) when controlling an ADV.

The object is accomplished by the subject matter of the independent claims. Advantageous developments with convenient and non-trivial further embodiments of the invention are specified in the following description, the dependent claims and the FIGURES.

The invention is concerned with a method for controlling a driving behavior of an autonomously driving vehicle (ADV), in particular when a habitual behavior of traffic participants at a specific point in a road network maybe taken into account. Furthermore, the invention concerns a processing device for a vehicle. The processing device can perform the inventive method. A system, a data storage medium and a vehicle are also comprised by the invention.

BRIEF DESCRIPTION OF THE FIGURES

FIG. 1 shows a schematic illustration of an embodiment of the inventive processing device performing an embodiment of the inventive method and a schematic illustration of an autonomous driving vehicle according to the invention.

DETAILED DESCRIPTION

The invention provides a method for controlling a driving behavior of an ADV. The method is performed by a processing device that performs a set of steps for driving through at least one predefined region of a road network. In other words, a driving behavior of the ADV in a predetermined region may be adapted to a behavior of traffic participants and/or traffic rules specific to the region, which may be determined by the processing device. The processing device may for example be a centralized computer and/or a remote computing device, which may be connected to the ADV using an internet connection and/or wireless connection (e.g. over WiFi and/or a cellular network).

The predefined region may be an area of a city, which may comprise at least a segment of a road network, e.g., in front of a building like a university campus and/or a restaurant and/or a library and/or a school and/or in front of a predefined public place, which pedestrians or cyclists may visit and/or leave by habitually crossing over the road in order to cut short their travel time and/or distance. In particular, it is assumed here that the crossing takes place at a place where no official crosswalk or traffic light is available. Autonomously driving vehicles and/or vehicle drivers, should nevertheless be able to take into account this habitual (in-official) crossing over of the road by the pedestrians and/or the cyclists when travelling along the predefined region.

One of the steps performed by the processing device comprises receiving trace data of the region. The trace data may comprise sensor data from at least one sensor of a vehicle and/or sensor data of a stationary sensor and/or map data from a digital road map describing the region and/or a least one point of interest (POI), e.g. a restaurant at a side of the road in the region, and/or image data of an image of the region from a satellite. The sensor data may for example be at least one image of the region from a camera. The trace data may describe at least one trace in the region, e.g. at a point close to a road in the region. Such a trace can be, e.g., a trodden path in the grass ending at the road indicating the habitual behavior of traffic participants to approach and step on the road at this point. Generally, the trace data describe at least one trace of historic movements and/or behaviors of past traffic participants in the region. According to the method, the trace data describe traces of regular movements and/or the habitual behaviors that are incompatible with and/or are not anticipated by traffic regulations currently valid in the region. In other words, the processing device may determine a habitual behavior which may not be permissible and/or anticipated according to the traffic rules in the region. For example, the sensor data may describe traces of a pedestrians regularly crossing a road in the region. The sensor data may describe the traces of road crossing events of the pedestrians and/or the cyclists in the region. In particular, the trace data do not describe the events themselves, i.e. they do not show a traffic participant actually performing the habitual behavior, but rather the remaining traces as they result from several repeated events that are based on the habitual behavior. Consequently, it is envisaged that the rule data are preferably derived independently of any traffic participant actually visible in the trace data.

The second step performed by the processing device involves deriving rule data describing the regular movements and/or behaviors of the past traffic participants described by the trace data. In other words, a general description of the movements and/or behaviors is derived, e.g. by calculating an average line of movement. The processing device may derive a region-specific rule data based on the trace data. It may provide a different set of rule data for a different region. The rule data may be determined based on a former behavior of traffic participants detected in the trace data.

The third step performed by the processing device involves providing the rule data to a motion model of the autonomously driving vehicle (in particular a motion model of an autonomous driving function of a driving control system). For this step, it is assumed that the motion model is designed to perform a prediction of a typical motion of an average traffic participant. The vehicle may comprise a driving control system that plans and/or adapts a driving trajectory by detecting a traffic participant in the region and predicting a future behavior of the respective detected traffic participant using the motion model. The motion model may provide a control signal to the driving control system of the vehicle to adapt a planned trajectory of the vehicle in the region. The motion model can be based on a prediction algorithm (as is known from the prior art) and the rule data may be used to adapt or configure the motion model to the current situation in the region. By providing the rule data to the motion model, the driving control system of the vehicle may plan and/or adapt the driving trajectory in that it detects a traffic participant in the region and predicts a future motion of the respective detected traffic participant using the motion model and may then include in its trajectory planning the behavior of the traffic participant that may be incompatible with and/or not anticipated by traffic regulations currently valid in the region.

In other words, the autonomously driving vehicle may plan and/or change its driving speed and/or driving direction based on an instantaneous detection of a traffic participant in the region. The motion model may take into account the presence and/or current detected behavior of the detected traffic participant for determining a future trajectory planning of the autonomously driving vehicle for the region. The output of the motion model or modelling parameters of the motion model may vary depending on a timing of a day and/or weather conditions in the region. The motion model can be a software-based simulation or a processing function, or an algorithm, which may assist the driving control system of the autonomously driving vehicle to define its motion trajectory for the region. Motion models as such are known in the prior art.

The invention provides the advantage that the driving behavior or a trajectory of an autonomously driving vehicle for a region of a road network can be planned and/or adapted according to the habitual behavior and/or movement of other traffic participants along the road network event if that behavior cannot be derived from or is even contrary to the traffic rules or traffic regulations currently in force in that region. For example, a behavior or movement cannot be derived from traffic rules or traffic regulations, if it is not explicitly considered or coded in the traffic rules or traffic regulations. For example, a movement across a law or a flower bed or in general a specific area is a movement that might not be mentioned in the traffic rules or traffic regulations as being allowed or forbidden (i.e. not regulated), such that it is impossible to derive from the traffic rules or traffic regulations that a traffic participant might perform such a movement across that area. In particular, such a movement might not be derivable, if that specific area is not designed for traffic participants, like is the case for a flower bed or a law at the side of a road that separates the road from a pavement. Additionally or alternatively, a trace may comprise of information on an old architectural layout of the road network in the region and/or information on formerly valid traffic regulations that governed or enforced specific historic movements and/or behaviors, but that are not existing any more. In this case, a "trace" is given by historic layout data and/or historic regulation data.

The technical effect therefore is that the rule data may be determined or derived without observing the actual participants during their regular or habitual movements. This is an effective way to observe regular or habitual movements and/or to derive the corresponding rule data as the respective "trace" only needs to be observed once for recognizing regular or repeated movements. Observing the participants would instead require many observations in order to recognize or verify the regularity or frequency of occurrence of their movements. This information is accumulated in the respective trace as the trace only exists due to the regular movements or (in the case of an old architectural layout and/or historic traffic regulations) caused the regular movements.

The invention also comprises embodiments that provide features which afford additional technical advantages.

In one embodiment, the trace data comprise image data of at least one image showing at least a part of the respective region. The image may describe a current or a past situation, e.g. a movement of pedestrians or cyclists on a road network or in the close proximity (e.g. sides) of the road network of the region. In particular, the respective image may describe a landmark or trace of repeated movements of traffic participants, e.g. traces on the ground. Such a landmark or trace can be identified without the need of observing the actual traffic participants with a sensor, e.g. a camera. The image may describe pedestrians standing on a side or at a point of the road network. The image may for example be an image from an onboard sensor of the vehicle and/or a satellite image and/or from a digital road map. An image can be a pixel based camera image or a radar image or an ultrasonic image or a LIDAR image.

One embodiment comprises that deriving the rule data comprises determining a physical worn-out zone and/or damaged zone as it results from the regular movements of the past traffic participants along an unofficial/unfortified walking and/or driving track. In other words, the habitual behavior of the traffic participants and/or the pedestrians may be determined on the basis of at least one physical trace of a damage in the region, especially without the past traffic participants being actually present. The physical trace of the damage may for example be a broken or worn part of at least one object in the region (e.g. plants) and/or it may be a clean area (as may result from rubbing or shuffling feet) or a walking passage in the grass that may be caused due to regular movements of the pedestrians and/or the traffic participants. This provides an advantage that marks on the road or on the sides of the road indicating a regular movement of pedestrians, which may not comply with general traffic rules, can serve as signs of a possible presence of pedestrians and/or cyclists.

In one embodiment the physical worn-out zone and/or damaged zone comprises a trodden or driven path that leads through plants and/or in between plants. The damaged zone may describe a brown path and/or dry earth and/or in general a color different from the rest of surrounding grass and/or a surrounding surface structure. In other words, the damaged zone may describe a pavement or a worn path, which may be formed by regular movements of the pedestrians and/or the cyclists at least one a side of a road of the region. The path may for example be a walking track in a grass filed. This provides an advantage that the habitual behavior of the pedestrians and the vehicles in a specific region may be determined based on sensor data.

In one embodiment, the physical worn-out zone and/or damaged zone comprises a worn-away part of a layer covering a ground surface. In other words, a ground surface may be torn away due to regular movement of pedestrians and/or regular rides of cyclists along it. The worn-out zone may, for example, describe a clean surface of track in a moss covered road side area.

In one embodiment, the physical deformation and/or damaged zone is detected in the at least one image on the basis of a predefined color criterion and/or a predefined surface structure criterion. In other words, a walking track that may be caused by the regular movements of the pedestrian can be identified based on its color differentiation in an image compared to its adjoining areas. The image may for example describe the damaged zone or the walking track in grey or brown color, which may be sandwiched between two grassed areas.

In one embodiment, the trace data comprise layout data describing an old architectural layout of the road network in the region before roadworks that lead to the currently valid traffic regulations. In other words, construction works on a road and/or a part of the road may cause a temporary or a permanent change in the traffic rules and/or habits of the pedestrians or cyclists. The temporary change can be, for example, a closure of the road and/or a diversion to an alternate road for the traffic participants. The permanent change may describe, for example, a construction of a roundabout and/or a flyover and/or an underpass for an optimized traffic management. This provides the advantage that the autonomously driving vehicles may adapt its trajectory planning or traffic rules based on the sensor data if changes in the architectures of the region are detected.

In one embodiment, the trace data comprise historic regulation data describing formerly valid traffic regulations that were replaced by the currently valid traffic regulations. In other words, the trace data may describe old habits of the pedestrians and/or former driving behavior of the traffic participants, as enforced by the law, which may not match the current legal regulations for the pedestrians and/or driving behavior of the traffic participants. The trace data may describe former traffic rules, which may not be compliant with the current traffic rules. The change in the old traffic rules and/or the habitual behavior pedestrians or the traffic participants may be caused due to changes in the architecture or road network in the region. According to the past traffic rules, the traffic participants may be required to stop at a point of the region due to a traffic signal. According to the current traffic rules, the traffic participants may be allowed to continue driving since the traffic signal may be replaced by a roundabout and/or a flyover and/or an underpass in the region. This provides an advantage that the autonomously driving vehicle can adapt its driving behavior for a region depending on detected changes in traffic rules and/or behavior of other vehicles and/or pedestrians so that a safe driving of the vehicle can be ensured.

In one embodiment, the rule data are provided in a map database that associates the respective rule data to the at least one region, wherein the map database accesses the rule data as a function of position data describing a current or future geographic position of a vehicle. In other words, respective traffic rules specific to a corresponding region or a road network of the region may be stored in a databank. The respective traffic rules may be retrieved when a current position of the vehicle is detected to be located in and/or near the corresponding the region. The position of the vehicle may be detected based on a global positioning system. This provides the benefit that the storing of driving behavior of vehicles or image data for a respective region may assist an autonomously driving vehicle to dynamically adjust its driving behavior according to the officially and/or unofficially valid rules of the respective region.

The invention also provides a processing device comprising at least one processor and a non-volatile data storage medium. The processing device can be, for example, a desktop computer and/or a laptop and/or or a mobile computing a device. The processing device may comprise a single processor or multiple processors. The respective processor can be a multi-core microprocessor. The at least one processor of the processing device is coupled to the storage medium. The storage medium comprises computer readable instructions that cause the at least one processor to perform a method according to one of the embodiments of the invention, if executed by the at least one processor.

The invention also provides a method for operating a driving control system of a vehicle for predicting a behavior of at least one traffic participant. The driving control system may be provided by an electronic control unit of the vehicle. The driving control system may for example comprise a computer and/or a microcontroller and/or a computing device, which may be installed in the vehicle and/or may be placed at a remote location. The driving control system is designed to plan a driving trajectory and thereby consider a predicted behavior of the at least one traffic participant by performing several steps. A first step involves detecting the at least one traffic participant in a respective region of a road network. A second step comprises obtaining rule data that describes at least one behavioral rule of traffic participants for the respective region. The rule data are obtained from a processing device that provides the rule data based on method according to one of the embodiments of the method regarding the processing device. A third step includes predicting a respective future movement of the at least one detected traffic participant based on the rule data. A fourth step includes deriving a control signal for setting a trajectory, i.e. a speed and/or a driving direction, as a function of the respective predicted future movement of the at least one detected traffic participant.

In one embodiment, a current geographic position information is received from a position sensor of the vehicle, such as a receiver for a position signal of a GNSS (Global Navigation Satellite System). A proximity to and/or an approach at the region is detected in a digital road map. For the region, the rule data are selected from the digital map database, which may comprise several sets of different rule data. Each of the different sets of rule data may be specific to a different region of the road network.

The invention is also concerned with an autonomous driving vehicle comprising a driving control system. The driving control system comprises at least one processor and a non-volatile storage medium. The storage medium comprises instructions that cause the at least one processor to perform the described method regarding the usage of rule-data according to any of the embodiments of the invention.

Combining an embodiment of the described processing device and at least one embodiment of the described vehicle yields a system that is also part of the invention. The invention is thus also concerned with a system that comprises a processing device and at least one vehicle according to the invention.

The invention also comprises a non-volatile computer readable data storage medium, wherein the data storage medium stores computer readable instructions that cause at least one processor of the described processing device to perform a method regarding the processing device, if executed by the at least one processor.

The invention also comprises the combinations of the features of the different embodiments. In other words, further embodiments may comprise a respective combination of features of the embodiments described above.

The embodiment explained in the following is a preferred embodiment of the invention. However, in the embodiment, the described components of the embodiment each represent individual features of the invention which are to be considered independently of each other and which each develop the invention also independently of each other and thereby are also to be regarded as a component of the invention in individual manner or in another than the shown combination. Furthermore, the described embodiment can also be supplemented by further features of the invention already described.

In the FIGURES identical reference signs indicate elements that provide the same function.

The FIGURE (FIG.) FIG. 1 illustrates a motor vehicle 10 that can be an autonomously driving vehicle or a driverless vehicle, e.g. passenger vehicle or a freight vehicle. The vehicle 10 may be driving in a predefined region 20 of a road 90 of a road network. The region 20 may be a country or a state or a city or a specific area in a city. The region 20 may be in an area of a city and/or a rural region. The region 20 may be a section of the road 90. The region 20 may be known for commercial and/or public activities. The vehicle 10 may consider a habitual traffic behavior of other traffic participants, e.g. other vehicles and/or pedestrians and/or cyclists, when the vehicle 10 is travelling along a road 90 in the region 20. The habitual behavior may be non-compliant with and/or unforeseen by the general valid traffic rules of a region and may therefore not be predictable from the traffic rules that are currently valid in the region 20.

In an exemplary situation, the habitual behavior of other traffic participants may be taken into consideration when a service facility 50 is located on a side of the road 90 in the region 20 and/or at least one building of commercial or academic activities of the service facility 50 is located on one side of the road 90. The service facility 50 may be for example a restaurant and/or a kiosk and/or a bar. Pedestrians and/or cyclists from the opposite side of the road 90 may have developed the habit of regularly visiting the service facility 50 by crossing over the road 90 in the region 20, although no official crosswalk or crossing area is provided, like, e.g., a traffic light. The pedestrians and/or cyclists may cross over the road 90 to cut short their distance and/or when there is no nearby alternate route for them to visit the service facility 50.

For deriving or sensing the habitual behavior, at least one sensor 30 may detect traces of one or more instance of the habitual behavior of the pedestrians and/or cyclists, or in general traffic participants. "Traces" means that not the actual traffic participants are sensed by the at least one sensor 30 while they are performing the habitual behavior and/or movement, but rather a result of the regular execution of the respective habit (habitual behavior and/or habitual movement), like, e.g. the regular crossing of the road 90 in the region 20, which may result in a trace in the form of a trodden path or a worn out zone 70, e.g. a trodden path in a green area next to the road 90, as there is no crosswalk. The color and/or structure of the worn out zone may be different from that of the surrounding green area.

The at least one sensor 30 may be a camera and/or a LIDAR-sensor and/or a radar sensor and/or an infrared sensor. The at least one sensor 30 may be arranged in vehicles passing through the region 20 (before vehicle 10) and/or it may be located at a point in the region 20 and/or in a satellite S that is observing the region 20. The respective sensor 30 may acquire sensor data 30' at pre-defined points in time, which may be for example a fixed gap of every 30 minutes up to, e.g., once a year. The intervals of this data acquisition may be different for different portions of the day. The intervals specified for morning hours and/or in the noon time (e.g. lunch time) and/or in the afternoon may be different from the rest of the day. The interval for data acquisition may be adapted based on a probability that pedestrians or cyclists may cross over the road 90 and/or the traffic flow of the vehicles may be high. The probability may be assumed or determined based on peak traffic hours of the day when the pedestrians could be expected to cross over the road 90 in the region 20. The peak hours could be early morning hours, e.g. from 07:00-09:00 and/or 12:00 to 13:00 (e.g. lunch break) and evening hours, e.g. 17:00-19:00. The probability may also be estimated based on a model using historic sensor data for the region 20.

The sensor data 30' may be provided to a processing device 40 that may be designed as a server computer of the internet or as a workstation computer or a desktop computer or a laptop, just to name examples. The processing device 40 may be located at a remote location, e.g. a building, like, e.g., a laboratory. The processing device 40 may comprise at least one processor P. The processing device 40 may comprise at least one non-volatile storage medium M for at least storing the sensor data 30' and/or instructions I for processing the sensor data 30'. The non-volatile storage medium M can comprise a flash memory and/or read-only memory and/or a magnetic storage device (e.g. hard disk drive) and/or an SSD (solid state drive). The processor P may be coupled to the storage device. The at least one sensor 30 may transmit its sensor data 30' to the processing device 40 via a communication network. The communication network may be based on a wireless connectivity and/or a physical connection.

The sensor data 30' may at least describe an image of the region 20. The image may describe an instance of habitual behavior of traffic participants, which may be a past record of movements of pedestrians or cyclists and/or behavior of other vehicles along the road 90 in the region 20. The stored sensor data 30' therefore constitute trace data 31. The sensor data 30' may describe the past or historic movements of the traffic participants based on at least a visible trace in the respective image. The trace may describe the worn-out zone 70 or a marking at least on a side of the road 90 and/or in a predefined proximity of the road 90 in the region 20 (e.g. at a distance less than 10 meters from the road 90), which may be formed by the habitual or regular movement of the traffic participants. The worn-out zone 70 may describe a track or passage, which may be a grey or a brown area in a grassy field. The worn-out zone 70 may be a dry earth and/or a worn path, which pedestrians or cyclists or animals may have trodden. The trace may describe landmarks indicating the habitual behavior of pedestrians and/or the cyclists. The landmarks may for example be sideways of the road 90 in the region 20, along which pedestrians may be walking and/or may be expected to walk. The landmark may be determined based on the sensor data 30', e.g. at least one camera image and/or at least one satellite image.

The trace data 31 may describe the behavior of the traffic participants, which may have been valid in the past but it may be invalid according to current traffic regulations. Therefore, the movements and/or behaviors of traffic participants may not be anticipated according to the currently valid traffic rules of the region 20. For example, the pedestrians may be crossing over the road 90 in the region 20 according to the habitual behavior and may thus be blocking the traffic flow in violation of officially valid traffic regulations. In other words, traffic participants may be aware of the unofficially valid behavior of the pedestrians and/or the cyclists to cross over the road 90 in the region and may follow that behavior.

The movements and/or behaviors of the past traffic participants may not be anticipated according to the currently valid traffic rules of the region 20. For example, the pedestrians may be crossing over the road 90 in the region 20 and thus block the traffic flow in violation of officially valid traffic regulations. In other words, the traffic participants who frequent region 20 may be aware of the unofficially valid behavior of the pedestrians and/or the cyclists to cross over the road 90 in the region 20 although there is no crosswalk.

These habit-based "traffic rules" specific to the predefined region 20 or the road 90 in the region 20 may be called ghost rules. The ghost rules are not official rules, as defined and/or accepted by the concerned authorities. The ghost rules may describe a common understanding of the traffic participants or the drivers of vehicles that the pedestrians and/or cyclists may be expected to cross over the road 90 in the region 20.

As a matter of routine or a precautionary measure, drivers of vehicles may habitually slow down their driving speed when they approach the region 20. The drivers of vehicles may stop or they may change their driving trajectory if a pedestrian 21 can be seen standing or walking on the side of the road 90 in the region 20 in the anticipation that this pedestrian 21 may cross over the road 90 according to the habitual behavior. For example, the pedestrian 21 may cross road 90 to reach the service facility 50 or (as another example) alight a bus at a bus station that may be located on another side of the road 90 of the region 20 (i.e. service facility 50 may be the bus station). The pedestrian's 21 intention of crossing the road 90 may be determined based on a position and/or a movement direction and/or a perception of autonomously driving vehicles or the vehicle drivers.

As the vehicle 10 is controlled by a driving control system DCS that is running an autonomous driving function A, the vehicle 10 may not be able to "guess" the pedestrian's 21 behavior. Instead, the autonomous driving function A of the vehicle 10 plans its driving trajectory (line of movement and corresponding speed values) based on the pre-defined traffic rules that are currently valid in the region 20.

Nevertheless, the autonomous driving function A of the vehicle 10 may be provided with additional rule data 11 regarding the "ghost rules" such that these ghost rules may be taken into account by the autonomous driving function A of the vehicle 10 as though they were additional traffic rules.

The processing device 40 may derive the rule data 11 of the ghost rules for the region 20 based on the stored sensor data 30', i.e. the trace data 31 describing the traces of the regular movements and/or of the habitual behavior of other traffic participants in the past. The processing device 40 may comprise programming instructions I that may, e.g., run an artificial neural network ANN and/or an image analysis for detecting, e.g. the worn out zone 70 in images described by the trace data 31. The processing device 40 may comprise a display for presenting the trace data 31 to an operator and user input from the operator may be received by the processing device 40 at an input unit, comprising e.g. a keyboard and/or a computer mouse. The user input may indicate a trace that the operator recognizes in the displayed trace data 31.

The detection may be based on, e.g., at least one of the following criteria: color, structure, difference in color, difference in structure, shape (e.g. winding path). Depending on the detected object, e.g. a worn out zone 70 of e.g. specific color, it may be determined what type of habitual behavior has caused this detected object. The association of the detected object to a corresponding habitual behavior may be based on a look-up table and/or may be implemented in the ANN. For each habitual behavior, a corresponding ghost rule may be provided that is defined by corresponding rule data 11. The habitual behavior may be described as a line of movement that may describe the habitual route of other traffic participants.

The rule data 11 may describe a set of traffic rules, which may be not officially valid but they may be specific to the road 90 or the whole region 20 and/or which the traffic participants may practice as a routine without a legal basis. In other words, the rule data 11 may describe a common agreement of traffic participants with respect to their driving behavior in the region 20, and that thus may cause human drivers e.g. to slow or stop their vehicle to let the pedestrians pass over the road 90 of the region 20. This reaction to a pedestrian 21 can be transferred to the autonomous driving function A of the vehicle 10 on the basis of the rule data 11.

The vehicle 10 may define its driving parameters for the region 20 and/or adapt its driving trajectory based on the rule data 11. The vehicle 10 may for example anticipate that the pedestrian 21 or cyclists may cross over the road 90 and/or other traffic participants may drive slowly and/or the vehicles moving ahead may change their respective trajectory. The pedestrian 21 or a cyclist may be detected by the autonomous driving function A of the vehicle 10 on the basis of sensor data of at least one sensor 12 of the vehicle 10.

The processing device 40 may determine the rule data 11 based on the trace data 31 and may associate the rule data 11 with map data of a digital road map 80 of the region 20. The map data and/or the rule data 11 may be stored in a map database that may be accessed by the autonomous driving function A. The autonomous driving function A of vehicle 10 may determine position data of a current position of the vehicle 10 based on, e.g., a receiver for receiving a position signal of a GNSS (global position satellite system), e.g. the GPS (global positioning system), and may determine that it is in region 20 or is approaching region 20. The receiver therefore constitutes a position sensor of the vehicle 10. From the map data the region-specific rule data 11 are available for region 20.

A motion model 13 of the autonomous driving function A may be configured based on the received rule data 11 and may perform a prediction of a typical motion of an average traffic participant for the region 20 based on the rule data 11. The motion model 13 may be a computer algorithm or a simulation software. It may be installed in the vehicle 10 (as shown) and/or on the remote processing device 40.

The motion model 13 may acquire sensor data from at least the sensor 12 of the vehicle 10 and may detect the pedestrian 21 and may predict or estimate a behavior of the detected pedestrian 21 (or in general any type of traffic participant) according to the received rule data 11.

A predicted behavior B may comprise describing motion parameters (e.g. a moving speed and/or a moving direction) of the detected traffic participant, e.g. the pedestrian 21. The motion model 13 may provide the predicted, future parameters of a future motion for planning the trajectory of the vehicle 10 when the vehicle 10 approaches the region 20 and/or when the region 20 is detected to be lying on a predefined route. The trajectory planning may comprise describing for example the speed and/or line of movement in the region 20 for the vehicle 10. By the resulting trajectory data of an adapted trajectory the vehicle 10 may be controlled to change its speed and/or direction of driving when the vehicle 10 is approaching the pedestrian 21.

The motion model 13 may be based on an algorithm taken from the prior art. Such a known motion model 13 may normally be operated on the basis of official traffic rules that describe the valid behavior of traffic participants in a region. In vehicle 10, the motion model 13 is additionally or alternatively provided with the rule data 11 describing the in-official ghost rules as determined from the trace data 31.

The trace data 31 may additionally or alternatively describe a change in the traffic regulations. The region 20 may for example have a traffic signal and/or a Zebra crossing marked in the past so that the pedestrians and/or cyclists could easily pass over the road 90 of the region 20 without having to worry about the traffic regulations. The region 20 may not have the Zebra crossing and/or the traffic signal according to the currently valid traffic regulations. The change in the traffic regulations may also describe a change in the architecture of the region 20 and/or a construction of new buildings and/or maintenance or construction work of roads and/or construction of new linking roads in the region 20. The change in the architecture of the region 20 may describe an installation of a roundabout traffic. The road in the past may be closed for the vehicular traffic due to construction or maintenance works on the road 90 and/or a route connected to the region 20. The pedestrians may be allowed to cross over the road 90 according to the past traffic rules due to closure of the road 90 or the region 20 to the vehicular traffic.

The basic idea is to consider the "ghost rules" in the prediction algorithms of an autonomous driving vehicle 10 (ADV). When another traffic participant (in the example it is pedestrian 21) is detected by the sensors 12 of the ADV and a prediction for an expected movement or behavior is calculated by the motion model 13, not only the official, currently valid traffic regulations will be considered, but also the ghost rules that might also form a basis of the behavior of the traffic participant, although these ghost rules are not officially implemented.

Such ghost rules may be derived from the history of the specific place that the ADV is approaching. Possible sources for ghost rules are:

Habits of the local inhabitants/students/office workers who frequent the place (habitual road crossing points)

Former traffic regulations that where valid at the place until recently and that have been replaced recently Changes in the architecture of the road (installation of a roundabout traffic)

Typical behavior of pedestrians at bus stations

In general: any meta-information regarding the history of the place, wherein the meta-information should have rule-character Starting from these meta-information, the digital map of the road network may be enriched with additional, in-official "ghost rules" for modelling the potential behavior of traffic participants. An ADV will therefore automatically model or predict potential movements of other detected traffic participants on the basis of the ghost rules as well as the official rules.

The inventive idea uses a digital road map like it is already used by an ADV to gain information on its surroundings. In such a map, landmarks are entered that indicate a habitual behavior. Such a landmark could be a trodden path in the grass ending at a road, the end of a pedestrian sidewalk that is continued on the opposite side of the road. These landmarks can be identified without the need of observing pedestrians with a camera.

Starting from such landmarks, an algorithm can estimate/extrapolate possible motion trajectories of pedestrians across the road. For example, the trodden path ending on one side of the road can be connected with the trodden path beginning on the opposite side of the road. This gives a line indicating the motion trajectory that a pedestrian might follow. The map thus provides information to the ADV regarding a possible path of movement of a pedestrian across the road.

When the ADV now approaches such a landmark AND detects a pedestrian on one side of the road, the ADV can adapt its driving behavior by taking into account that the detected pedestrian might take the marked possible path of movement across the road. The path planning algorithm of the ADV might use the information. For example, it might slow down as there is a certain possibility that the pedestrian might cross the road although there is no official, marked crossing area whatsoever. If no pedestrian is detected, the motion path may be ignored as there is no danger of a pedestrian crossing the road.

This concept is generalized by the invention. In a digital road map, certain POIs (points of interest) regarding pedestrians are already marked (e.g. bus stations). For some such POIs it can be expected that pedestrians cross the road immediately before or after reaching the POI. For example, persons leaving a bus that just stopped at a bus station tend to cross the road directly behind the bus. Pedestrian who are late and try to catch a bus, tend to cross the road near the bus station. Thus, said algorithm could enter corresponding motion trajectories starting at or leading to such selected POIs (bus stations, football stations, concert halls, supermarkets, schools).

Advantage of the idea: No statistical analysis based on observing numerous pedestrians is needed. Starting from visible landmarks or old traffic regulations or models of a typical behavior, an algorithm can estimate/extrapolate the possible paths of motions in the digital map immediately.

Landmarks can be identified in satellite images and/or by evaluating camera images showing the landmarks, not the crossing pedestrians (ending pedestrian sidewalks, muddy, trodden paths).

When the traffic rules have changed in a specific place (e.g. new regulation regarding the right of way), the algorithm might enter a possible motion path on the basis of the old, now invalid traffic rule as someone might still follow that old rule.

Current time may be considered (bus schedule, opening hours of supermarket) for setting a probability value that a pedestrian might actually cross the road.

Dynamic objects may be considered for setting the probability value (approaching bus indicates that pedestrian might try to reach the bus station).

When a dynamic object is at the POI (e.g. bus at bus station), the possible motion path of pedestrians may be taken into account even is NO pedestrian has been detected, as a pedestrian may be occluded by the dynamic object (considering pedestrians behind a bus).

Paths entered by the algorithm may be derived by connecting two points (one on each side of the road) or on the basis of a fluid model (representing a whole group of persons leaving the POI, e.g. a bus station).

Map information are enriched on the basis of additional knowledge regarding additional, in-official rules that might have an influence on the behavior of traffic participants. These ghost rules might be derived from observing traces (trodden paths) and/or by considering the history of specific places and/or typical patterns of behavior (e.g. at bus stations).

An ADV may therefore anticipate a behavior that may not be predicted/explained on the basis of the official, currently valid traffic regulations.

Overall, the implementation example shows how a driving behavior of an autonomously driving vehicle can be controlled, in particular when a habitual behavior of traffic participants at a specific point in a road network may be taken into account.

The invention therefore comprises in particular the following aspects:

Aspect 1: Method for controlling a driving behavior of an autonomously driving vehicle (10), wherein a processing device (40) performs the following steps for at least one predefined region (20) of a road network:

receiving trace data (31) of the region (20), wherein the trace data (31) describe at least one trace of historic movements and/or behaviors of past traffic participants in the region (20), wherein the movements and/or behaviors are incompatible with and/or not anticipated by traffic regulations currently valid in the region (20);

deriving rule data (11) describing regular movements and/or behaviors of the past traffic participants described by the trace data (31); and providing the rule data (11) to a motion model (13) of the vehicle (10), the motion model (13) being designed to perform a prediction of a typical motion of an average traffic participant, wherein the vehicle (10) comprises a driving control system (DCS) that plans and/or adapts a driving trajectory by detecting at least one traffic participant (21) in the region (20) and predicting a future behavior (B) of the respective detected traffic participant (21) using the motion model (13).

Aspect 2: Method according to aspect 1, wherein the trace data (31) comprise image data of at least one image showing at least a part of the respective region (20) and wherein deriving the rule data (11) comprises determining a physically worn-out zone (70) and/or damaged zone as it results from the regular movements of the past traffic participants along an unofficial/unfortified walking and/or driving track.

Aspect 3: Method according to aspect 2, wherein the physical worn-out zone (70) and/or damaged zone comprises a trodden or driven path that leads through plants and/or a dry earth surface.

Aspect 4: Method according to aspect 2 or 3, wherein the physical worn-out zone (70) and/or damaged zone comprises a worn-away part of a layer covering a ground surface.

Aspect 5: Method according to any of aspects 2 to 4, wherein the physically worn out zone (70) and/or damaged zone is detected in the at least one image on the basis of a predefined color criterion and/or a texture criterion and/or a predefined surface structure criterion.

Aspect 6: Method according to any of the preceding aspects, wherein the trace data (31) comprise layout data describing an old architectural layout of the road network in the region (20) before roadworks occurred that lead to the currently valid traffic regulations.

Aspect 7: Method according to any of the preceding aspects, wherein the trace data (31) comprise historic regulation data describing formerly valid traffic regulations that where replaced by the currently valid traffic regulations.

Aspect 8: Method according to any of the preceding aspects, wherein the rule data (11) are provided in a map database that associates the respective rule data (11) to the at least one region (20), wherein the map database accesses the rule data (11) as a function of position data describing a current or future geographic position of a vehicle (10).

Aspect 9: Method according to any of the preceding aspects, wherein some or all of the trace data (31) do not show any traffic participant actually performing the movements and/or behavior and/or wherein the rule data (11) are derived independently of any traffic participant actually visible in the trace data (31).

Aspect 10: Processing device (40) comprising at least one processor and a non-volatile data storage medium (M), wherein the at least one processor (P) is coupled to the storage medium (M) and wherein the storage medium (M) comprises computer readable instructions that cause the at least one processor (P) to perform a method according to any of the preceding aspects, if executed by the at least one processor (P).

Aspect 11: Method for operating a driving control system (DCS) of a vehicle (10) for predicting a behavior of at least one traffic participant (21), the method comprising detecting the at least one traffic participant in a respective region (20) of a road network, obtaining rule data (11) describing at least one behavioral rule for the respective region (20), wherein the rule data (11) are obtained from a processing device (40) that provides the rule data (11) on the basis of method according to any of the preceding aspects 1 to 9, predicting a respective future movement of the at least one detected traffic participant (21) on the basis of the rule data (11), deriving a control signal for setting a speed and/or driving direction as a function of the respective predicted future movement of the at least one traffic participant (21).

Aspect 12: Method according to aspect 11, wherein a current geographic position information is received from a position sensor and in a digital road map (80) a proximity and/or an approach at a predefined landmark or region (20) is detected, and for the landmark or region (20), the rule data (11) are selected from the digital map database from several different sets of region-specific rule data (11).

Aspect 13: Autonomous driving vehicle (10) comprising a driving control system (DCS) that comprises at least one processor and a non-volatile storage medium, wherein the storage medium comprises instructions that cause the at least one processor to perform a method according to aspect 11 or 12, if executed by the at least one processor.

Aspect 14: System comprising a processing device according to aspect 10 and a vehicle according to aspect 13.

Aspect 15: Non-volatile computer readable data storage medium (M), wherein the data storage medium (M) stores computer readable instructions (I) that cause at least one processor (P) to perform a method according to any of the aspects 1 to 9, if executed by the at least one processor (P).

The invention claimed is:

1. A method for controlling a driving behavior of an autonomously driving vehicle, the method comprising, by a processing device:
for at least one region of a road network, receiving trace data of the region, wherein the trace data describe at least one trace of historic movements and/or behaviors of past traffic participants in the region, wherein:
the respective trace comprises:
a remaining trace as it results from several repeated events that are based on a habitual behavior, and/or
an old architectural layout of the road network in the region,
and/or formerly valid traffic regulations, and
the movements and/or behaviors are incompatible with and/or not anticipated by traffic regulations currently valid in the region;
deriving rule data describing regular movements and/or behaviors of the past traffic participants described by the trace data;
providing the rule data to a motion model of the vehicle, the motion model being designed to perform a prediction of a typical motion of an average traffic participant, wherein the vehicle comprises a driving control system (DCS) that plans and/or adapts a driving trajectory by detecting at least one traffic participant in the region and predicting a future behavior of the respective detected traffic participant using the motion model;
wherein the DCS controls the vehicle according to the driving trajectory.

2. The method according to claim 1, wherein;
the trace data comprise image data of at least one image showing at least a part of the respective region, and
deriving the rule data comprises determining a physically worn-out zone and/or damaged zone as it results from the regular movements of the past traffic participants along an unofficial/unfortified walking and/or driving track.

3. The method according to claim 2, wherein the physical worn-out zone and/or damaged zone comprises a trodden or driven path that leads through plants and/or a dry earth surface.

4. The method according to claim 2, wherein the physical worn-out zone and/or damaged zone comprises a worn-away part of a layer covering a ground surface.

5. The method according to claim 2, wherein the physically worn out zone (70) and/or damaged zone is detected in the at least one image on the basis of a color criterion and/or a texture criterion and/or a surface structure criterion.

6. The method according to claim 1, wherein the trace data comprise layout data describing an old architectural layout of the road network in the region before roadworks occurred that lead to the currently valid traffic regulations.

7. The method according to claim 1, wherein the trace data comprise historic regulation data describing formerly valid traffic regulations that were replaced by the currently valid traffic regulations.

8. The method according to claim 1, wherein the rule data are provided in a map database that associates the respective rule data to the at least one region, wherein the map database accesses the rule data as a function of position data describing a current or future geographic position of a vehicle.

9. The method according to claim 8, wherein:
a current geographic position information is received from a position sensor and in a digital road map a proximity and/or an approach at a predefined landmark or region is detected, and
for the landmark or region, the rule data are selected from the digital map database from several different sets of region-specific rule data.

10. The method according to claim 1, wherein some or all of the trace data do not show any traffic participant actually performing the movements and/or behavior and/or wherein the rule data are derived independently of any traffic participant actually visible in the trace data.

11. A processing device comprising at least one processor and a non-volatile data storage medium, wherein the at least one processor is coupled to the storage medium and wherein the storage medium comprises computer readable instructions that cause the at least one processor to perform the method according to claim 1, when executed by the at least one processor.

12. The method according to claim 1, further comprising, by the DCS of the vehicle, predicting a behavior of the at least one traffic participant by:
obtaining additional rule data describing at least one behavioral rule for the respective region, wherein the additional rule data are obtained from the processing device,
predicting a respective future movement of the at least one traffic participant on the basis of the additional rule data, deriving a control signal for setting a speed and/or driving direction as a function of the respective predicted future movement of the at least one traffic participant.

13. An autonomous driving vehicle comprising a driving control system (DCS) that comprises at least one processor and a non-volatile storage medium, wherein the storage medium comprises instructions that cause the at least one processor to perform the method according to claim 12, when executed by the at least one processor.

14. A non-volatile computer readable data storage medium, wherein the data storage medium stores computer readable instructions that will cause at least one processor to perform the method according to claim 1, when executed by the at least one processor (P).

* * * * *